UNITED STATES PATENT OFFICE.

MAX LANDAU, OF BERLIN, GERMANY.

IMPREGNATED WOOD AND PROCESS OF MAKING THE SAME.

1,198,040.     Specification of Letters Patent.    Patented Sept. 12, 1916.

No Drawing.     Application filed November 13, 1914. Serial No. 872,050.

*To all whom it may concern:*

Be it known that I, MAX LANDAU, chemist, a subject of the King of Prussia and the German Emperor, residing at 29 Bayerischestrasse, Berlin, Kingdom of Prussia, German Empire, have invented a new and useful Improvement in Impregnated Wood and the Process of Making the Same; and I do hereby declare the following to be a full, clear, and exact description of the same.

The present invention refers to a new impregnated wood and the process of making the same.

The new impregnated wood consists of wood containing polynitrophenols, the hydrogen of the phenol group being substituted by non-basic organic groups. The process of making the new impregnated wood consists in introducing polynitrophenols dissolved in a liquid or mixed with a liquid into wood. One has already proposed to impregnate wood for preserving the same with nitro-derivatives of the phenols. I have now found that such derivatives of nitrophenols of the aromatic or naphthalene series, in which the hydrogen of the phenol group has been substituted by organic non-basic groups, have a greatly higher fungicide and preserving property than the unsubstituted phenols. Such derivatives are for instance the acidyl- or alkyl-derivatives of the nitrophenols containing more than one nitro group, as the acetyldinitrophenol $C_6H_3(NO_2)_2.OCOCH_3$, formyldinitrophenol $C_6H_3(NO_2)_2.O.COH$, benzoyldinitrophenol $C_6H_3(NO_2)_2.O.COC_6H_5$, methyldinitrophenol $C_6H_3(NO_2)_2.OCH_3$, ethyldinitrophenol $C_6H_3(NO_2)_2.OC_2H_5$, alphaacetyldinitronaphthol $C_{10}H_5(NO_2)_2.OCOCH_3$, acetyltrinitrophenol $C_6H_2(NO_2)_3.OCOCH_3$, the sulfonic acids of the said compounds. The acidyl-derivatives of polynitrophenols have a melting point below 100 degrees centigrade. One can use this property for preparing emulsions containing relatively small proportions of the said acidylderivatives by heating the same with water and agitating the mixture. The acidyl and alkyl derivatives of the polynitrophenols are non-explosive, so that the dried impregnated woods may be employed in mines without any danger.

For carrying out my invention I shall describe the preparation of the acetyldinitrophenol and the manner of using it. 1 part by weight of dinitrophenol is mixed with 4 parts by weight of acetic anhydrid and ¼ part by weight of fused sodium acetate and boiled for 4 hours. The mass is then poured into cold water preferably containing ice. After some hours of standing a cake of crystals is formed. One may separate the said crystals of acetyldinitrophenol from the water and use the raw product directly for impregnation. One may, however, carry out a further purification by dissolving the crude acetyldinitrophenol in benzene and precipitating the acetyldinitrophenol by addition of ligroin. The pure acetyldinitrophenol has the melting point of 64 degrees centigrade, it is soluble in alcohol, ether, benzene, insoluble in ligroin.

For carrying out the impregnation of wood one mixes 1 part by weight with 1000 parts by weight of water at 70 degrees centigrade and agitates the mixture for emulsifying the molten acetyldinitrophenol. The mixture can be introduced into the wood by pressure maintaining the liquid at temperatures at which the acetyldinitrophenol will be molten. The wood may be subjected to vacuum before the impregnation and the liquid is introduced at atmospheric pressure or at a higher pressure.

Another method consists in dissolving acetyldinitrophenol in tar oils, benzene or mineral oils and in introducing the liquid into the wood by pressure, if desired after previously subjecting to the wood vacuum.

In using aqueous liquid one may add fireproofing inorganic salts in order to diminish the inflammability of the impregnated wood. Such salts are for instance: sodium chlorid, potassium sulfate, magnesium chlorid, magnesium sulfate.

Another new derivative of dinitrophenol suitable for my purpose is formyldinitrophenol. It may be prepared in the following way: 1 part by weight of dinitrophenol or of its sodium salt is mixed with 3 parts by weight of formic acid preferably free of water and heated until a fused mass is formed. To this mass ½ part by weight of phosphorylchlorid is added, preferably drop by drop, while heating the mass to about 80 degrees centigrade until the evolution of hydrochloric acid has ceased. The product of the reaction is poured into cold water and may be purified by crystallization from benzene. The melting point is degrees centigrade.

In order to prepare benzoyldinitrophenol one heats one part by weight of dinitrophenol and ⅔ parts by weight of benzoylchlorid to about 110 degrees centigrade. The product of the reaction is poured into water and may be purified by washing with a solution of sodium carbonate and may be crystallized from benzene. The melting point is 135 degrees centigrade.

The impregnation of the wood is effected as described hereinbefore.

Under the term polynitrophenol I understand the nitrophenols having more than one nitro group and also such nitrophenols having other groups besides the nitro group for instance the sulfonic group $SO_3H$.

I claim:

1. Impregnated wood containing polynitrophenols the hydrogen of the phenol group being substituted by non-basic non-aromatic organic groups.

2. Impregnated wood containing polynitrophenols the hydrogen of the phenol group being substituted by organic acid groups.

3. The method of impregnating wood which consists in introducing thereinto polynitrophenols the hydrogen of the phenol group being substituted by non-basic, non-aromatic organic groups.

4. The method of impregnating wood which consists in introducing a mixture of a liquid and of polynitrophenols the hydrogen of the phenol group being substituted by non-basic, non-aromatic organic groups.

5. The method of impregnating wood which consists in introducing a mixture of polynitrophenols the hydrogen of the phenol group being substituted by non-basic, non-aromatic organic groups and of a liquid heated above the temperature at which the said derivatives of the polynitrophenols melt.

6. The method of impregnating wood which consists in introducing a mixture of polynitrophenols the hydrogen of the phenol group being substituted by non-basic, non-aromatic organic groups of a liquid and of an inorganic fireproofing salt.

In testimony whereof, I have signed my name to this specification in the presence of two subscribing witnesses.

MAX LANDAU.

Witnesses:
    HENRY HASPER,
    WOLDEMAR HAUPT.